United States Patent [19]
Bobrowicz et al.

[11] 3,715,644
[45] Feb. 6, 1973

[54] PROPORTIONAL INTERPOLATOR IN MULTIAXIS MACHINES

[75] Inventors: Vincent F. Bobrowicz, Livonia; Hubert B. Henegar, Detroit, both of Mich.

[73] Assignee: The Bendix Corporation

[22] Filed: June 2, 1971

[21] Appl. No.: 149,266

[52] U.S. Cl. ............................. 318/573, 235/151.11
[51] Int. Cl. ............................................ G05b 19/24
[58] Field of Search .................. 318/573; 235/151.11

[56] References Cited

UNITED STATES PATENTS

| | | | |
|---|---|---|---|
| 3,465,332 | 9/1969 | Neal et al. | 318/573 X |
| 3,297,924 | 1/1967 | Kamm | 318/573 |
| 3,621,216 | 11/1971 | Wortzman | 318/573 X |

Primary Examiner—Benjamin Dobeck
Attorney—Lester L. Hallacher and Plante, Hartz, Smith and Thompson

[57] ABSTRACT

A system for causing proportional interpolation in a numerically controlled machine having three, or more, degrees of motion is described. Two of the degrees of motion may occur in a plane defined by perpendicular axes and can be planar or revolutional motions. These two motions would then be defined with respect to the axes and could be mathematically linear or nonlinear. The other degrees of motion can be revolutional or planar motions individually defined with respect to any of the axes of the system. The invention is directed to a system for causing all motions to be proportional to a selected one of the motions irrespective of whether the selected motion is linear or nonlinear. This is achieved by calculating proportionalities between the selected motion and the other motions and combining the calculated proportionalities with the programmed data to cause the final motion to be in accordance with the combined data.

17 Claims, 11 Drawing Figures

PATENTED FEB 6 1973

INVENTORS
VINCENT F. BOBROWICZ
HUBERT B. HENEGAR

BY *(signature)*

ATTORNEY

INVENTORS
VINCENT F. BOBROWICZ
HUBERT B. HENEGAR

ATTORNEY

PROPORTIONAL INTERPOLATOR IN MULTIAXIS MACHINES

BACKGROUND OF THE DISCLOSURE

Various types of numerically controlled equipment require four degrees of motion in order to realize the desired configuration of the physical output traced by the numerically controlled equipment. The physical output traced by the numerically controlled equipment can have the end result of cutting a machined part, scribing lines on a medium or electron writing within a medium capable of supporting a three-dimensional visual image. For convenience and clarity, the invention is described in the environment of a numerically controlled machine for cutting parts, such as machine tools. However, this choice of environments is not intended to limit the scope of the invention.

The grinding of a ballnose on the end of a mill requires a series of complex motions and accordingly is chosen as an exemplary profile to be machined. An understanding of the motions required for this operation can be gained by reference to FIG. 1. In FIG. 1, a longitudinal piece of Stock 10 having a circular cross-section is to be machined so that the end has a Spherical Configuration 11. The Stock 10 is positioned so that its motions are defined with respect to the X–Z axes, as shown. The material removal required to achieve the spherical end configuration is accomplished by the use of a Grinding Wheel 12 positioned in the proximity of the Stock 10. Grinding Wheel 12 rotates about its Center Axis 13 in known manner so that the relative motion between the wheel and the part required for cutting is attained.

In order to realize the desired spherical end configuration, it is necessary for either Stock 10 or Wheel 12 to move relative to the other. In this explanation it is assumed that the Stock 10 moves; however, the relationships presented hereinafter are valid if Cutting Wheel 12 moves and Stock 10 remains stationary. The desired end configuration requires movement in the X–Z plane, and therefore the movement is defined with respect to these axes. The path of motion in the X–Z plane will be circular and the vector velocity within the plane will be constant, although the motion with respect to the individual axes will change. Therefore, the component velocities along the X and Z axes are determined by the mathematical expression of the desired end configuration, although the vector velocity remains constant.

It will be noted that if only X and Z motions are utilized Stock 10 will be cut in the X–Z plane but will be uncut in the X–Y and Y–Z planes. Therefore, in order to achieve a spherical configuration around the circumference of Stock 10 it is necessary to rotate Stock 10 about its longitudinal axis as shown by Arrow 14. This motion is the third degree of motion required and hereinafter is referred to as "A axis motion," "A axis," or "A motion."

It should be noted that the desired spherical configuration can be realized in a single revolution about the A axis if the A motion is incremental or stepped and one arcuate portion of the spherical configuration is realized between each of the incremental steps. Alternatively, the A motion can be constant and motion in the X–Z plane incremental. In the following description either of these operations is possible. The combined three motions defined with respect to the X, Z, and A axes therefore are capable of machining a spherical configuration on the end of the Stock 10. It will be noted that, if desired, a configuration other than spherical can be used. That is, the final configuration can be defined as elliptical or parabolic, or any other desired type of spheroid.

The machining of a ballnose requires more than simply a spherical configuration on the end of the stock. It also requires the cutting of flutes into the material. This is illustrated with respect to FIG. 2, which shows an exemplary type of ballnose mill which can be made by using the inventive concepts. The spherical End 11 of Mill 16 shown in FIG. 2 can be machined by use of the three degrees of motion defined hereinabove. However, in order to cut the Flutes 17 and the Gashes 18 into Mill 16 it is necessary to have a fourth degree of motion. This degree of motion requires changing the orientation of the Cutter 12 with respect to Stock 10. This can be achieved by rotating Cutter 12 about the C axis as shown in FIG. 1 or, alternatively, by rotating Stock 10 about an axis resulting in the equivalent motion. However, for convenience the fourth degree of motion is referred to as "C axis motion," "C axis," or "C motion." The C motion occurs about an axis which is perpendicular to Axis of Rotation 13 of Cutter 12. This changes the orientation of the cutting surface of Cutter 12 with respect to Stock 10 and results in the required Flutes 17 and 18 shown in FIG. 2. An article entitled, "Coming Soon: Numerically Controlled Cutter Grinding," edited by Daniel B. Dallas, and published by Ingersoll Milling Machine Company, describes the three-axis prior art systems and discusses a four-axis system.

Existing equipment for fabricating mills and other types of machine tools do not have the fourth degree of motion, and therefore the grinding operations required for the Flutes 17 and Gashes 18 are achieved by the use of cam actuated machines. This is true even for numerically controlled machines. This is deficient because no presently existing machine is capable of the exact motions required for realizing the optimum configuration of the final machine tool. As a consequence, most end mills, and particularly the ballnose types, wear unevenly, resulting in rapid wear and breakdown of the cutting tool.

SUMMARY OF THE INVENTION

The specific embodiment of the invention described overcomes these disadvantages in that it provides four degrees of motion along with the capability of proportioning the four motions so that the revolutional motions vary in accordance with the velocity of the planar motion. Because the revolutional motions are proportional to the planar motions, the revolutional motions are mathematically linear even though a circular or arcuate path is being scribed by the planar motions. This is accomplished by providing appropriate interpolators in the control circuitry of the numerically controlled machine. The interpolators receive both programmed and calculated inputs required to effect the desired mathematically linear motion about the rotational axes. The calculated inputs are appropriately interpolated and then are used to control the revolutional motion interpolators, resulting in the control of the servos used to effect the actual revolutional motions.

Although the invention is described in the environment of a four-axis system, two of which are planar and two of which are rotary, the inventive concepts are equally applicable to a wide variety of systems. For example, the inventive concepts can be utilized in systems having more, or less, than four axes. Furthermore, all axes can be either rotary or planar; and obviously any combination of planar and rotary axes can be used. The type of motion and the shape of the line traced by the motion are also immaterial to the inventive concepts.

In essence, the invention consists of adding calculated data to one or more of the system motions so that these motions are proportional to a selected motion and all motions undergo the same type of interpolation. In this manner a real axis, which ordinarily is independent of the selected axis, is controlled so its motion is related to that of the selected axis. In one embodiment this is accomplished by using hypothetical or imaginary axes to derive the calculated data used in effecting the proportional movement.

DETAILED DESCRIPTION

Figure 1:
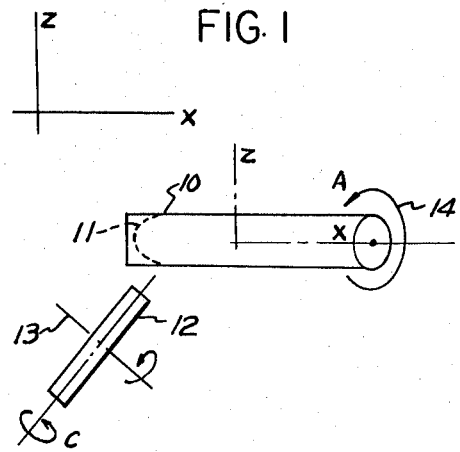
FIG. 1 is a schematic showing of the degrees of motion required of the machine and relates these degrees of motion to an X-Z plane.
Figure 2:
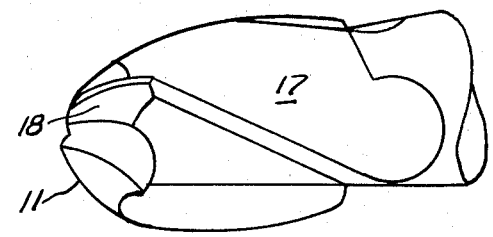
FIG. 2 is an exemplary showing of a ballnose mill which can be cut utilizing the inventive concepts.

The provision of the four degrees of motion described hereinabove solves a very perplexing problem of long standing in the art. Heretofore it has not been possible to precisely machine many cutting tools because of the absence of the fourth degree of motion. The invention permits the addition of the fourth degree of motion and also shows how numerically controlled equipment can be used to control all four motions. This is important because when using four degrees of motion some control problems must be solved. For example, when the motion described with respect to the X and Z axes is circular or otherwise nonlinear, the A and C motions must be operating in a mathematically linear manner and all the programmed motions must be completed simultaneously. Furthermore, the A and C motions must be proportional to the X axis feed rate, because this feed rate varies when a circular arc, or other nonlinear path, is transversed even though the vector feed rate within the X-Z plane remains constant. It is therefore necessary to vary the feed rate of the A and C motions in order to realize the desired results described with respect to FIG. 2.

Figure 3A:
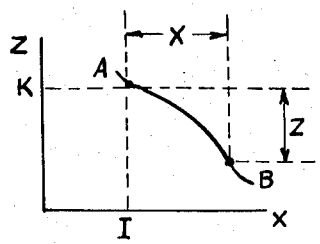
FIG. 3a shows an arcuate motion in the X-Z plane.
Figure 3B:
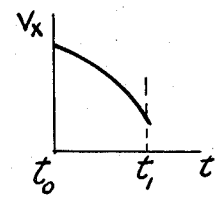
FIGS. 3b and 3c are graphical representations of the change of velocity in the X-Z plane with respect to the X and Z axes.
Figure 3C:
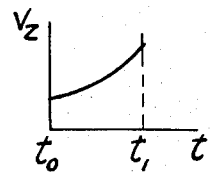

The problem solved can be more readily understood by reference to FIGS. 3a, 3b, and 3c. FIG. 3a shows the X-Z plane and a circular motion between Points A and B. Point A is the initial starting point and is defined along the Z axis by the parameter K and along the X axis by the parameter I. Because the motion is circular the resultant vector of the X and Z motions is a constant. However, the X and Z parameters themselves change in accordance with the equation of a circle. As a consequence, the velocity $V_x$ with respect to the X axis and the velocity $V_z$ with respect to the Z axis are nonlinear as shown in FIGS. 3b and 3c respectively. The times $t_o$ and $t_1$ of FIGS. 3b and 3c are the initial and terminal times, respectively, and correspond to Points A and B of FIG. 3a.

Figure 4A:
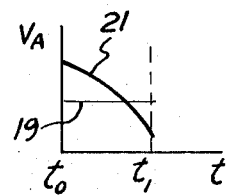
FIGS. 4a and 4b show the prior art system linear response about the revolutional axes, and also the desired proportional rotational responses.
Figure 4B:
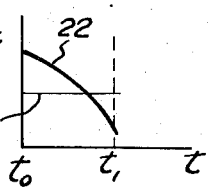

Because it is desired to have the A and C motions vary proportionally to the X axis velocity $V_X$, it is necessary for the velocities $V_A$ and $V_C$ to vary as illustrated by Curves 21 and 22 of FIGS. 4a and 4b. Ordinarily the $V_A$ and $V_C$ velocities would be linear as shown by Curves 19 and 20 of FIGS. 4a and 4b, respectively. The inventive system therefore includes circuitry which causes velocities $V_A$ and $V_C$ to vary in accordance with velocity $V_X$.

It will be appreciated that, in FIGS. 3a and 3b and also in FIGS. 4a and 4b, the horizontal axis represents time, with the time $t_o$ being the initial time which corresponds to Point A in FIG. 3a and the time $t_1$ is the termination time which corresponds to Point B in FIG. 3a. It is now evident that the control circuitry described herein must simultaneously be capable of rendering outputs which control the A and C motions such that they vary proportionally to the X motion $V_X$ even when $V_X$ is nonlinear, and at the same time initiate and terminate the A and C motions simultaneously with the initiation and termination of motion between the Points A and B.

It will be appreciated that the instant invention is intended for utilization in a numerically controlled machine which will have a calculating capability and thus will be able to perform the necessary calculations. It will also be appreciated that the X and Z motions and the A and C motions required to achieve the desired physical output configuration will be preprogrammed and will be stored in a storage mechanism capable of being read by a computer. For example, punched or magnetic cards or tape, a magnetic memory bank, or other form of storage device can be used to store the programmed data. Because the numerical control equipment has computer capability, the changes required to realize the proportionality between the A and C motions and the X axis velocity $V_X$ will be calculated by the computer and injected into the control circuitry.

Figure 6A:
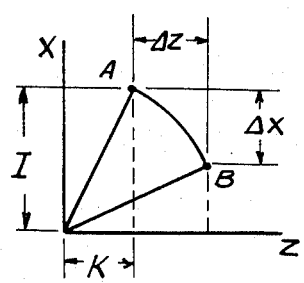
FIGS. 6a, 6b, and 6c show graphs useful in establishing the proportionalities relating all motion to a single axis motion.
Figure 6B:
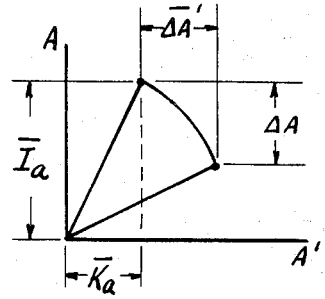
Figure 6C:
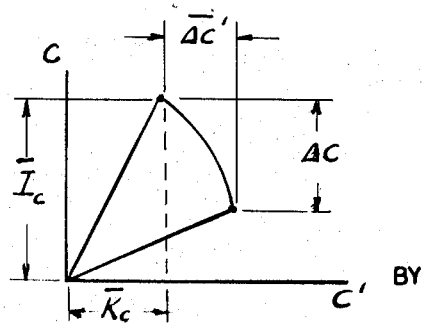

FIGS. 6a, 6b, and 6c are useful in understanding the required programmed and calculated parameters. FIG. 6a shows the X-Z plane and the programmed parameters I and K, I being the initial displacement along the X axis and K being the initial displacement along the Z axis. Travel along the arc shown between Points A and B results in a change $\Delta X$ of the X parameter and a similar change $\Delta Z$ of the Z parameter. The $\Delta X$, $\Delta Z$, I and K parameters define the X-Z plane values, and accordingly all are programmed into the memory mechanism. The equation which describes the path between Points A and B is also programmed into the memory mechanism.

FIG. 6b shows a curve of the actual A axis parameter and a hypothetical A' parameter. The A motion is defined hereinabove. The A' is a hypothetical axis of motion used to establish the changes in the A parameter required to realize the desired proportional relationship with the ΔX motion. FIG. 6b also defines an $\overline{I}_A$ and a $\overline{K}_A$ parameter which respectively represent initial displacements along the A and A' axes. The $\overline{I}_A$ and $\overline{K}_A$ parameters are calculated parameters as is indicated by the bars appearing above them. This convention is used to designate calculated parameters throughout the description. The ΔA parameter shown in FIG. 6b is a programmed parameter because it is a parameter which is defined by the desired configuration of the part being machined.

FIG. 6c is very similar to FIG. 6b but it relates to the C and C' axes. The C motion is a programmed motion defined hereinabove, and C' is hypothetical and is similar to the A' axis. Initial displacement parameters $\overline{I}_C$ and $\overline{K}_C$ are defined with respect to the C and C' axes, respectively. The arcuate path then defines a change in the C' motion $\overline{\Delta C'}$ and a change in the C motion ΔC in a manner similar to the $\overline{\Delta A'}$ and ΔA parameters of FIG. 6b. Here again, the $\overline{\Delta C'}$ parameter is calculated and the ΔC parameter is a programmed parameter because it is determined by the desired configuration of the machined part.

Because the time period existing between the initiation and termination of the three paths defined in FIGS. 6a, 6b, and 6c is the same for all motions, the following relationships can be written:

$$\Delta X/\Delta A = I/I_a = K/K_a = \Delta Z/\Delta A' \quad (1)$$

From Equation (1) it is possible to write equations for the calculated parameters from the programmed parameters as follows:

$$\overline{I}_a = I(\Delta A/\Delta X) \quad (2)$$

$$\overline{\Delta A'} = \Delta Z (\Delta A/\Delta X) \quad (3)$$

$$\overline{K}_a = K (\Delta A/\Delta X) \quad (4)$$

In a similar manner, FIGS. 6a and 6c can be used to write the following proportionalities:

$$\Delta X/\Delta C = I/I_c = K/K_c = \Delta Z/\Delta C' \quad (5)$$

From Equation 75) it is possible to write equalities which relate the calculated values to the programmed parameters as follows:

$$\overline{I}_c = I(\Delta C/\Delta X) \quad (6)$$

$$\overline{K}_c = K (\Delta C/\Delta X) \quad (7)$$

$$\overline{\Delta C'} = \Delta Z (\Delta C/\Delta X) \quad (8)$$

Because the numerically controlled equipment has computing capability, operation of the system requires only the programming of the profile data ΔX, ΔZ, I, K, and ΔA and the proportions defined by Equations (2) (3), (4), (6), (7), and (8) into the system. Then when the calculated parameters are required because of nonlinear motion in the X-Z plane, the computing mechanism utilizes the programmed parameters and proportions to calculate the required calculated parameters. These parameters are then used to control the output motion in the desired manner by the utilization of a preferred embodiment of the inventive control circuit illustrated in FIG. 5.

The proper utilization of the above techniques also requires that the system have the capability of computing a feedrate number (FRN). The feedrate number is used to determine the rate of change of motion along the four axes defined above. The feedrate number can therefore be defined as follows:

$$FRN = K\left(\frac{IPM\ X, Z}{\Delta R}\right) \quad (9)$$

where:

$K$ = a constant determined by the characteristics of the system $IPM\ X,Z$ is the linear rate of Stock 10 in the X-Z plane, usually in inches per minute $\Delta R$ is defined as $\frac{\sqrt{I^2_{max} + K^2_{max}}}{2^n}$ $2^n$ is constrained so that the $\Delta R$ value lies between the values 0.5 and $\sqrt{2}$, and $I_{max}$ and $K_{max}$ are the largest $I$-$K$ pair among the $I$-$K$, $I_a$-$K_a$, and $I_c$-$K_c$ parameters illustrated in FIGS. 6a, 6b, and 6c.

It will now be appreciated that the A and C axes motions can be made proportional to the X motion by utilizing the proportions of Equations (1) through (8) when the motion in the X-Z plane is nonlinear. However, when the X-Z plane motion is linear, i.e., a straight line, no A' and C' parameters are required. Accordingly, the required inputs to the Interpolators of FIG. 5 for both forms of motion are presented in Table I.

TABLE I

| Linear Motion Data Input | Curved Motion Data Input | Interpolator |
|---|---|---|
| ΔX | ΔX, I | 25 |
| ΔZ | ΔZ, K | 26 |
| ΔA | ΔA, $\overline{I}_a$ | 27 |
| 0 | $\overline{\Delta A'}$, $\overline{K}_a$ | 28 |
| ΔC | ΔC, $\overline{I}_c$ | 29 |
| 0 | $\overline{\Delta C'}$, $\overline{K}_c$ | 30 |

Figure 5:
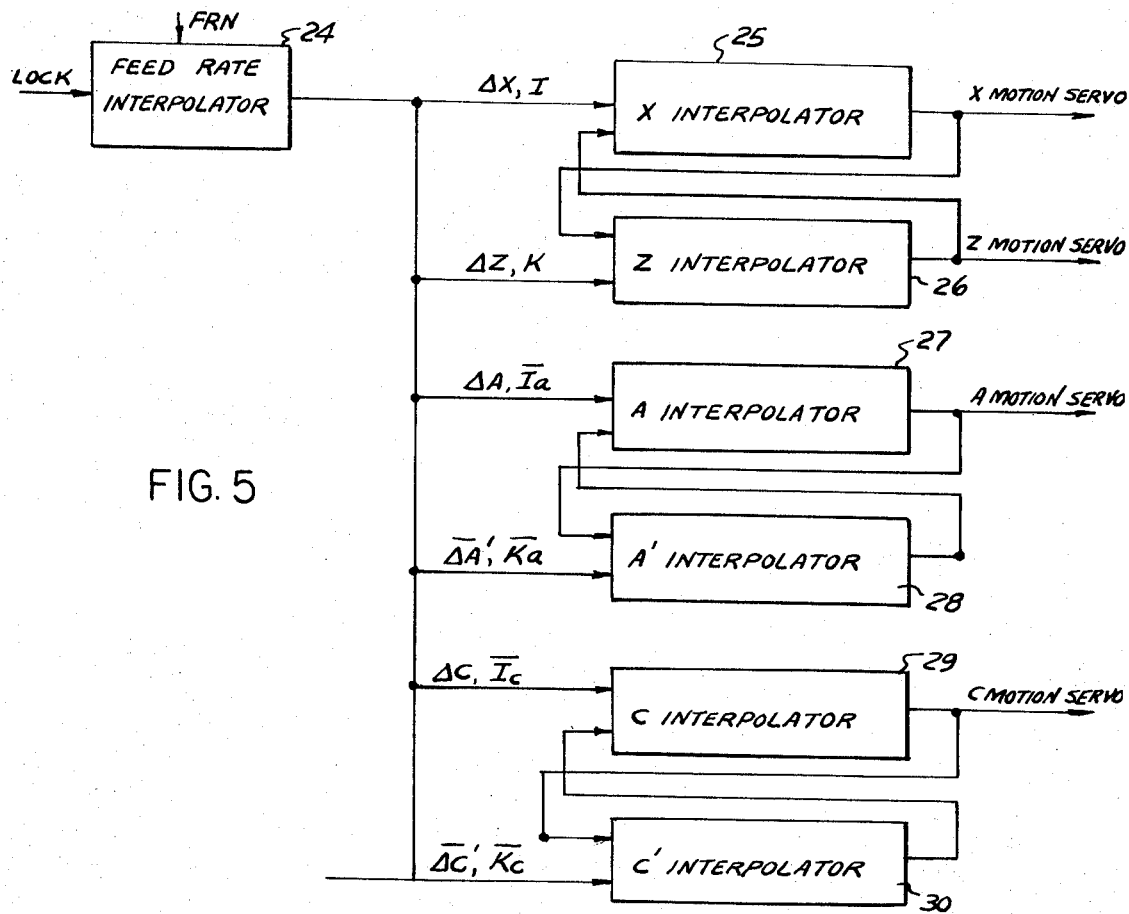
FIG. 5 is a preferred embodiment of the inventive system.

FIG. 5 shows a preferred embodiment of a control circuit useful with the inventive concepts. A Feedrate Interpolator 24 receives as an input the feedrate number (FRN) and the clock pulse. The clock pulse is a fixed frequency pulsed input determined from Equation (9), and accordingly will vary depending upon the parameters dictated by the profile of the physical output. Feedrate Interpolator 24 is actually a digital differential analyzer (DDA) of a type well known in the art. For example, the DDA described in U.S. Pat. No. 2,841,328 to F. G. Steele et al. can be used for DDA's 24 to 30 of FIG. 5. Because a DDA is used, the output of Interpolator 24 is a pulse output which is different from the clock input pulse by an amount determined by the feedrate number. The output of Interpolator 24 is directed to a series of Interpolators 25 through 30. The output of Interpolator 24 will be dependent upon the feedrate number, which is also dependent upon the programmed parameters, and accordingly the output is dependent upon the programmed parameters ΔX, I, ΔZ, K, ΔA, and Δ C. These parameters are injected into Interpolators 25 to 30 as illustrated in FIG. 5 and shown in Table I. As a consequence, the X axis Interpolator 25 receives a ΔX and an I input. At the same time, the Z axis Interpolator 26 receives a ΔZ and a K input. The output of X axis Interpolator 25 is injected into the input of the Z axis interpolator and the output of Z axis Interpolator 26 is injected into the input of X axis Interpolator 25. As a consequence, the desired X axis and Z axis motions are output from Interpolators 25 and 26, respectively. These two outputs respectively are used to actuate the X motion servo and the Z motion servo.

Parameters $\Delta A$ and $\overline{I}_a$ are input to motion Interpolator 27. Simultaneously, A' motion Interpolator 28 receives a $\overline{\Delta A'}$ and a $\overline{K}_a$ input. It will be noted that all inputs to Interpolators 27 and 28 are calculated with the exception of the $\Delta A$ input. The output of Interpolator 27 is used as an input to A' Interpolator 27 and also to control the A motion servo. However, the output of A' Interpolator 28 is used only as an input to A motion Interpolator 27.

The connections of C motion Interpolator 29 and C' motion Interpolator 30 are very similar to those of Interpolators 27 and 28. C motion Interpolator 29 receives a $\Delta C$ and an $\overline{I}_c$ input, while C' motion Interpolator 30 receives a $\Delta C'$ and a $\overline{K}_c$ input. The output of Interpolator 29 is used to control the C motion servo and also is utilized as an input to C' Interpolator 28. However, the output of C' Interpolator 30 is used only as an input to C motion Interpolator 29.

Because of these connections and the operation of the digital differential analyzers 25 through 30, the output of analyzers 25, 26, 27, and 29 control the X, Z, A, and C motions defined hereinabove in the proportional manner required for the desired operation and as defined by Equations (1) through (8).

What is claimed is:

1. A control circuit for causing proportional motions in a controlled system having four degrees of motion, one of said motions being a first programmed motion defined with respect to an axis, and the other of said motions being programmed motions defined with respect to the other axes of an orthogonal axes system containing said axis, said controlled system including means for translating programmed data describing said four motions into output motion signals, and being capable of calculating proportional parameters useful in making said programmed motions proportional to said first programmed motion, said control circuit comprising:

first signal combining means receiving programmed data relevant to said first programmed motion and producing a first of said output motion signals;

second signal combining means receiving programmed data relevant to one of said other programmed motions and producing a second of said output motion signals, said first signal combining means receiving said second output motion signal as an input, and said second signal combining means receiving said first output motion signal as an input;

third signal combining means receiving programmed data relevant to another of said programmed motions and at least one of said proportional parameters and producing a third of said output motion signals;

fourth signal combining means receiving at least one of said proportional parameters and producing a first interpolating signal, said third signal combining means receiving said first interpolating signal as an input and said fourth signal combining means receiving said third output motion signal as an input;

fifth signal combining means receiving programmed data relevant to another of said programmed motions and at least one of said proportional parameters and producing a fourth of said output motion signals;

sixth signal combining means receiving at least one of said proportional parameters and producing a second interpolating signal, said fifth signal combining means receiving said second interpolating signal as an input, and said sixth signal combining means receiving said fourth output motion signal as an input.

2. The control circuit of claim 1 in which said programmed data and said proportional parameters are input to said signal combining means in digital form.

3. The control circuit of claim 2 wherein said signal combining means are digital differential analyzers.

4. The control circuit of claim 1 further including feedrate determining means, said feedrate determining means receiving a fixed rate signal and a variable rate signal to thereby yield a feedrate signal dependent upon said variable rate signal, said variable rate signal being dependent upon initial displacement values along said axes, and said feedrate signal containing said programmed data and said proportional parameters so that said output motion signals determine the direction and rate of change of said four motions.

5. The control circuit of claim 4 wherein said proportional parameters are defined as:

$$\overline{I}_a = I(\Delta A/\Delta X)$$

$$\overline{\Delta A'} = \Delta Z(\Delta A/\Delta X)$$

$$\overline{K}_a = K(\Delta A/\Delta X)$$

$$\overline{I}_c = I(\Delta C/\Delta X)$$

$$\overline{K}_c = K(\Delta C/\Delta X)$$

$$\overline{\Delta C'} = \Delta Z(\Delta C/\Delta X)$$

where:

$\Delta X$ = programmed changes along an X of said perpendicular axes $\Delta Z$ = programmed changes along a Z of said perpendicular axes $\Delta A$ = programmed changes in one of said revolutional motions about an A axis $\Delta C$ = programmed changes in the other of said revolutional motions about a C axis I = an initial displacement along said X axis K = an initial displacement along said Z axis $\overline{\Delta A'}$ = calculated changes about a hypothetical A' axis $\overline{\Delta C'}$ = calculated changes about a hypothetical C' axis $\overline{I}_a$ = calculated initial displacement along said A axis $\overline{K}_a$ = calculated initial displacement along said A' axis $\overline{I}_c$ = calculated initial displacement along said C axis $\overline{K}_c$ = calculated initial displacement along said C' axis.

6. The control circuit of claim 5 wherein said variable rate signal (FRN) is defined as:

$$FRN = K\left(\frac{IPM\ X,\ Z}{\Delta R}\right)$$

where:

$K$ = a constant determined by the characteristics of the system $IPM\ X,\ Z$ = the linear rate of motion in the X-Z plane $\Delta R = \frac{\sqrt{I^2+K^2}}{2^n}$, with $2^n$ selected so that $$0.5 \leq \frac{\sqrt{I^2_{max}+K^2_{max}}}{2^n} < \sqrt{2}$$

where $I_{max}$ and $K_{max}$ are the largest I-K pair among I-K, $I_a$-$K_2$ and $I_c$-$K_c$.

7. An interpolating system for receiving programmed motion directing data and calculated motion directing data and yielding control signals, said programmed data including $\Delta X$ and $\Delta Z$ motions with respect to perpendicular X and Z axes and I and K displacement values with respect to said X and Z axes respectively, said programmed data also including $\Delta A$ and $\Delta C$ revolutional motions with respect to an A axis of motion and a C axis of motion respectively, said calculated data including $\overline{\Delta A'}$ and $\overline{\Delta C'}$ revolutional motions with respect to a hypothetical A' axis of motion and a hypothetical C' axis of motion respectively, said calculated data also including $\overline{I_a}$ and $\overline{K_a}$ displacement values with respect to said A and A' axes, respectively, and $\overline{I_o}$ and $\overline{K_o}$ with respect to said C and C' axes, respectively, said calculated data being established so that said revolutional motions vary in relationship to said $\Delta X$ motions in all instances, said interpolating system including:

first interpolating means receiving said $\Delta X$, $\Delta Z$, I and K data and yielding control signals for controlling motion with respect to said X and Z axes;

second interpolating means receiving said $\Delta A$, $\overline{\Delta A'}$, $\overline{I_a}$, and $\overline{K_a}$ data and yielding a control signal for controlling motion with respect to said A motion axis;

third interpolating means receiving said $\Delta C$, $\overline{I_c}$, $\overline{\Delta C'}$, and $\overline{K_c}$ data and yielding a control signal for controlling motion with respect to said C motion axis.

8. The interpolating system of claim 7 wherein said first, second, and third interpolating means each includes a plurality of mutually actuating signal comparison means.

9. The interpolating system of claim 8 wherein said programmed and said calculated data is digital and said signal comparison means are digital differential analyzers.

10. The interpolating system of claim 8 further including feedrate determining means for controlling the velocities of said motions.

11. The interpolating system of claim 10 wherein said calculated motions are defined as:

$\overline{I_a} = I(\Delta A/\Delta X)$ $\overline{\Delta A'} = \Delta Z(\Delta A/\Delta X)$ $\overline{K_a} = K(\Delta A/\Delta X)$ $\overline{I_c} = I(\Delta C/\Delta X)$ $\overline{K_c} = K(\Delta C/\Delta X)$ $\overline{\Delta C'} = \Delta Z(\Delta C/\Delta X)$ where:

$\Delta X$ = programmed changes along an X of said perpendicular axes $\Delta Z$ = programmed changes along a Z of said perpendicular axes $\Delta A$ = programmed changes in one of said revolutional motions about an A axis $\Delta C$ = programmed changes in the other of said revolutional motions about a C axis $I$ = an initial displacement along said X axis $K$ = an initial displacement along said Z axis $\overline{\Delta A'}$ = calculated changes about a hypothetical A' axis $\overline{\Delta C'}$ = calculated changes about a hypothetical C' axis $\overline{I_a}$ = calculated initial displacement along said A axis $\overline{K_a}$ = calculated initial displacement along said A' axis $\overline{I_c}$ = calculated initial displacement along said C axis $\overline{K_c}$ = calculated initial displacement along said C' axis.

12. The interpolating system of claim 11 wherein said feedrate number is defined as:

$$FRN = K\left(\frac{IPM\ X,\ Z}{\Delta R}\right)$$

where:

$K$ = a constant determined by the characteristics of the system $IPM\ X,\ Z$ = the linear rate of motion in the X-Z plane $\Delta R = \frac{\sqrt{I^2+K^2}}{2^n}$ with $2^n$ selected so that $$0.5 \leq \frac{\sqrt{I^2_{max}+K^2_{max}}}{2^n} < \sqrt{2}$$

where $I_{max}$ and $K_{max}$ are the largest I-K pair among I-K, $I_a$-$K_2$ and $I_c$-$K_c$.

13. The interpolating system of claim 12 wherein said programmed and said calculated data is digital and said signal comparison means are digital differential analyzers.

14. A control circuit for causing proportional motions in a system having at least three degrees of motion and including means for producing programmed motion inputs and for calculating proportional motion inputs, said proportional motion inputs being calculated so that at least some of said motions are proportional to a selected one of said motions, said programmed motion inputs defining degrees of motion with respect to at least two perpendicular axes and said calculated proportional motion inputs defining degrees of motion with respect to at least one assumed axis selected so that said calculated motion inputs combine with said programmed motion inputs and cause proportionality of movement among said degrees of motion, said control circuit comprising:

a plurality of signal combining means selectively receiving combinations of said programmed motion inputs and said proportional motion inputs and individually generating control signals individually representative of said degrees of motions.

15. The control circuit of claim 14 further including first interpolator means for interpolating at least one of said programmed motion inputs in accordance with a particular mathematically defined path, and second interpolating means for receiving said calculated motion inputs so that said calculated motion inputs cause the other of said programmed motion inputs to be interpolated in accordance with said mathematically defined path.

16. The control circuit of claim 14 wherein said plurality of signal combining includes one interpolating means for each of said degrees of motion, one of said interpolating means receiving one of said programmed motion inputs and interpolating said input according to a particular mathematical expression and yielding said selected one of said motions as an output; and the other of said interpolating means receiving the other of said programmed motion inputs and said calculated proportional inputs and interpolating said other programmed motion inputs in accordance with said mathematical expression.

17. The control circuit of claim 14 wherein said plurality of signal combining means includes:

first interpolator means for receiving a programmed motion input corresponding to said selected one of said motions and interpolating said input in accordance with a selected motion path configuration; and programmed motion interpolating means for each of the other of said degrees of motion; and assumed motion interpolating means for each of said assumed axis, said programmed motion interpolating means receiving selected ones of said programmed motion inputs and the output of selected ones of said assumed motion interpolating means so that the outputs of said programmed motion interpolating means are proportional to said motion path configuration.

* * * * *